(12) United States Patent
Carlson et al.

(10) Patent No.: US 9,178,514 B1
(45) Date of Patent: Nov. 3, 2015

(54) POLYMORPHIC HARDWARE ENGINE

(71) Applicant: CLOUD MEDICAL DOCTOR SOFTWARE INC, Phoenix, AZ (US)

(72) Inventors: Albert Henry Carlson, St. Louis, MO (US); Robert LeBlanc, Kingwood, TX (US)

(73) Assignee: Cloud Medical Doctor Sofware, Inc, Phoenix, AZ (US)

( * ) Notice: Subject to any disclaimer, the term of this patent is extended or adjusted under 35 U.S.C. 154(b) by 0 days.

(21) Appl. No.: 14/335,481

(22) Filed: Jul. 18, 2014

Related U.S. Application Data

(60) Provisional application No. 61/930,741, filed on Jan. 23, 2014.

(51) Int. Cl.
*H03K 19/003* (2006.01)
*H03K 19/0175* (2006.01)
*H03K 19/177* (2006.01)

(52) U.S. Cl.
CPC ...... *H03K 19/003* (2013.01); *H03K 19/017581* (2013.01); *H03K 19/17728* (2013.01)

(58) Field of Classification Search
CPC ............... H03K 19/003; H03K 19/017581; H03K 19/17736; H03K 19/17728; H03K 19/1776
USPC ............................................ 326/37–41
See application file for complete search history.

(56) References Cited

U.S. PATENT DOCUMENTS

| | | | | |
|---|---|---|---|---|
| 2008/0164907 A1* | 7/2008 | Mercaldi-Kim | ..... | H03K 19/177 326/41 |
| 2009/0219051 A1* | 9/2009 | Zhang | ..... | H03K 19/17752 326/38 |
| 2011/0145547 A1* | 6/2011 | Vorbach | ..... | G06F 9/30036 712/37 |

* cited by examiner

*Primary Examiner* — Dylan White
(74) *Attorney, Agent, or Firm* — Richard L. Moseley

(57) ABSTRACT

The invention uses a new process called dynamic pin reassignment (DPR) to alter the circuitry. The system assigns input and output signals to buses that lead to a central distribution point, the crossbar, in the circuit. At the crossbar, signals are routed to the appropriate destination over one of the bus wires to the correct chip from the crossbar. At irregular intervals, the signal mapping for each in/out function is changed. The assignments or mappings, comprise the state of the circuit at any time. The period that a state is valid is determined by applying a reseeding function to a portion of a randomized stream that calculates the next state and the duration of validity. Multiple seeds or keys are used to create the states. Because each key changes independently of the other keys and without notice, the time interval for a valid state is greatly reduced, complicating any effort to reveal the internal states of chips.

9 Claims, 3 Drawing Sheets

(No Data Transmitted
During Code Changes)

POLYMORPHIC HARDWARE ENGINE

BACKGROUND OF THE INVENTION

Today's modern lifestyle depends on digital computer systems and those systems are vulnerable to attacks that disrupt communications, alter/access data or issue false commands/data. Disrupting communications hampers the ability of the system to react to changing conditions. If that reaction is delayed too long the asset or facility may not be able to alter its operation in time to prevent a service outage or damage to the equipment. Altering and accessing data allows the system to react correctly but changes the situation to one which should not exist or simply supplies the intruder with sensitive information. Finally, issuing false commands tells the system to alter its state to react the wrong way, potentially resulting in damage to the system, or loss of service or loss of life. For example one type of attack that issues false commands is the "replay" attack in which an intruder or hacker records commands sent by the network and then replays it on the network. This attack is very effective because the attacker does not have to decrypt the message; he merely observes the effect of the traffic. Replay attacks can be used over and over until the system rejects those messages.

All of the attacks can be foiled using a single counter measure—polymorphism. Polymorphism or "mutating" is defined as the ability to change (perhaps an encryption from one method to another or hardware functionality) on the fly. Polymorphism has two components which when combined make up what the inventors herein call CipherLoc®. The two components are (1) a polymorphic cipher engine (the software) and
(2) a polymorphic hardware engine.

The polymorphic cipher engine and the polymorphic hardware engine platforms are designed to work together but are mutually exclusive of each other and can be used separately in a multitude of divergent ways.

The present invention is directed to the second component—the polymorphic hardware engine.

SUMMARY OF THE INVENTION

Certain types of support chips have the ability to be reconfigured while operating. These chips are called field programmable gate arrays (FPGA's). A field programmable gate array (FPGA) is an integrated circuit designed to be configured by a customer or a designer after manufacturing—hence "field-programmable". The FPGA configuration is generally specified using a hardware description language (HDL), similar to that used for an application-specific integrated circuit (ASIC) (circuit diagrams were previously used to specify the configuration, as they were for ASICs, but this is increasingly rare). Contemporary FPGAs have large resources of logic gates and random access memory (RAM) blocks to implement complex digital computations. As FPGA designs employ very fast I/Os and bidirectional data buses it becomes a challenge to verify correct timing of valid data within setup time and hold time. Floor planning enables resources allocation within FPGA to meet these time constraints. FPGAs can be used to implement any logical function that an ASIC could perform. The ability to update the functionality after shipping, partial re-configuration of a portion of the design and the low non-recurring engineering costs relative to an ASIC design (notwithstanding the generally higher unit cost), offer advantages for many applications.

FPGAs contain programmable logic components called "logic blocks", and a hierarchy of reconfigurable interconnects that allow the blocks to be "wired together"—somewhat like many (changeable) logic gates that can be inter-wired in (many) different configurations. Logic blocks can be configured to perform complex combinational functions, or merely simple logic gates like AND and XOR. In most FPGAs, the logic blocks also include memory elements, which may be simple flip-flops or more complete blocks of memory.

Some FPGAs have analog features in addition to digital functions. The most common analog feature is programmable slew rate and drive strength on each output pin, allowing the engineer to set slow rates on lightly loaded pins that would otherwise ring unacceptably, and to set stronger, faster rates on heavily loaded pins on high-speed channels that would otherwise run too slowly. Another relatively common analog feature is differential comparators on input pins designed to be connected to differential signaling channels. A few "mixed signal FPGAs" have integrated peripheral analog-to-digital converters (ADCs) and digital-to-analog converters (DACs) with analog signal conditioning blocks allowing them to operate as a system-on-a-chip. Such devices blur the line between an FPGA, which carries digital ones and zeros on its internal programmable interconnect fabric, and field programmable analog array (FPAA), which carries analog values on its internal programmable interconnect fabric.

The invention uses a new process called dynamic pin reassignment (DPR) to alter the circuitry. The system assigns input and output signals to buses that lead to a central distribution point, the crossbar, in the circuit. At the crossbar, signals are routed to the appropriate destination over one of the bus wires to the correct chip from the crossbar. At irregular intervals, the signal mapping for each in/out function is changed. The assignments or mappings, comprise the state of the circuit at any time. The period that a state is valid is determined by applying a reseeding function to a portion of a randomized stream that calculates the next state and the duration of validity. Multiple seeds or keys are used to create the states. Because each key changes independently of the other keys and without notice, the time interval for a valid state is greatly reduced, complicating any effort to reveal the internal states of chips.

DETAILED DESCRIPTION OF THE INVENTION

Figure 1:
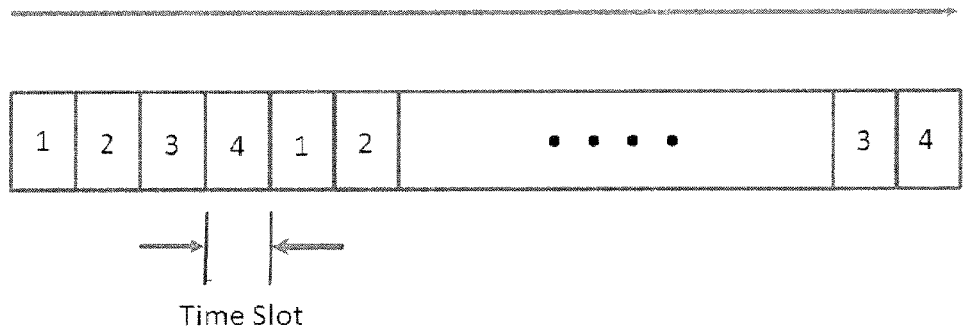
FIG. 1 is a graphic depiction of Linear Reconfiguration.
Figure 2:
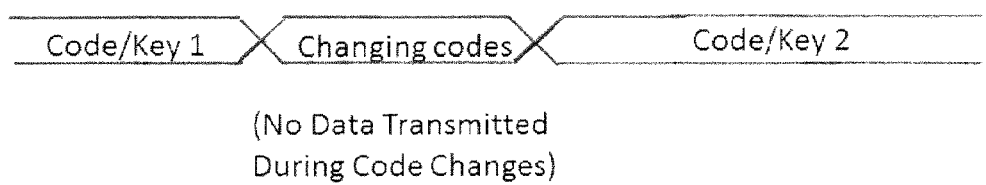
FIG. 2 is a graphic depiction of a single stream cipher with changing code key.

A concept called linear reconfiguration (LR) as illustrated in FIG. 1 is the practice of changing the configuration of something each time period. One of the major drawbacks of changing a cipher or key when using a polymorphic key progression algorithm (PKPA) is the latency encountered during the change. Ideally the next cipher/key combination would be synchronizing with the data stream while the present cipher/key combination is active. At the end of that period the encryption would immediately change to the next cipher/key data stream as illustrated in FIG. 2.

Unfortunately, if this transmission is noted and seen by a hacker, they would know how long a section of code has the same key and cipher, making it much easier to break. In addition it considerably slows down the transmission of data.

Figure 3:
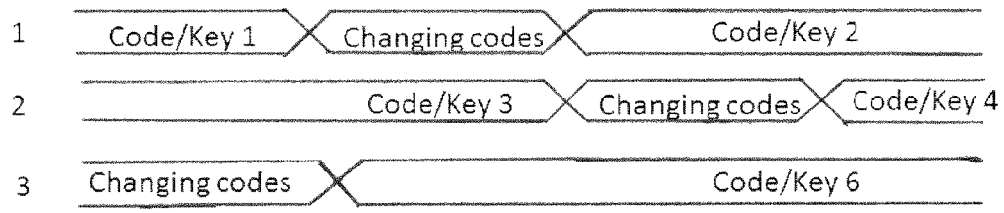
FIG. 3 is a graphic depiction of multiple stream ciphers with changing code keys.

Eliminating this latency overhead is very important and is one of the main considerations when choosing an effective implementation of ciphers. Ideally there would be several lines working simultaneously that were offset from each other by the correct amount. Each stream of data would be chosen one at a time, in sequence, In hardware this is known as multiplexing. Three different streams of encryption may be illustrated in FIG. 3.

Figure 4:
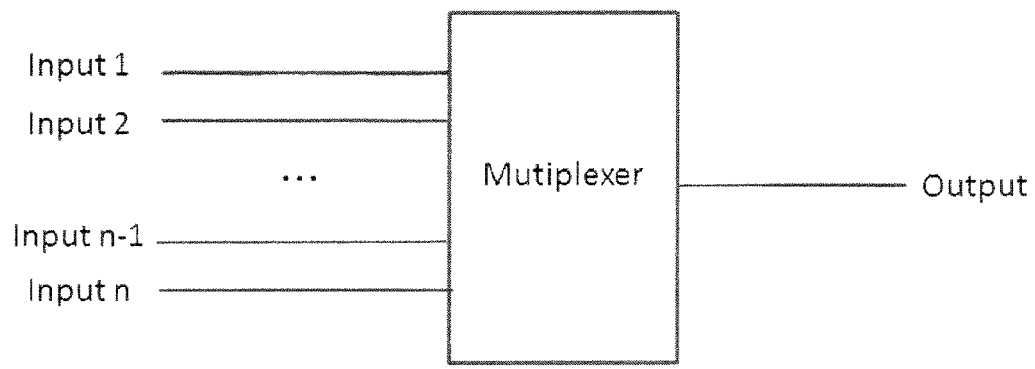
FIG. 4 is a diagram of the use of a multiplexer processing several input.

Note that each change of the cipher takes place while one of the other ciphers is stable. If the ciphers are applied until the change of ciphers on that stream, then the output changes to the next cipher/key pair in the next stream. The changes take place in a multiplexer with each line sequentially selected. Changes take place in less than a single character so there is no latency seen at the output and overhead takes place when a stream is inactive. This is illustrated in FIG. 4.

Figure 5:
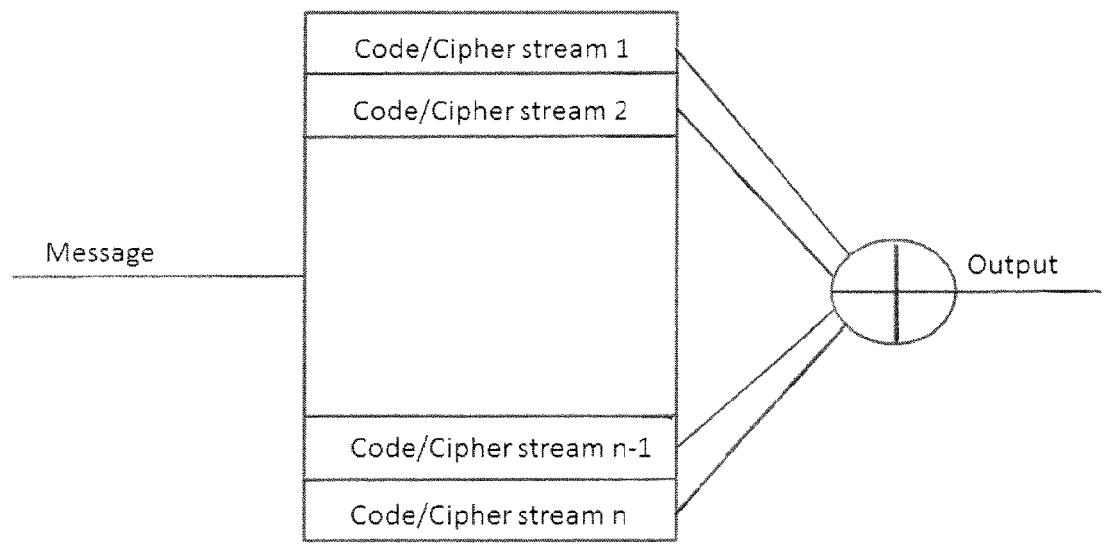
FIG. 5 is a diagram of the use of several code/cipher streams to process a message within a hardware multiplexer.

If the multiplexer is composed of individual streams then the diagram would look as shown in FIG. 5.

If the box consisting of code and cipher streams were a hardware implementation in a single FPGA, each cipher/key stream could be implemented in one reconfigurable sector. This has the same effect as shown for LR streams with no overhead and latency. Each sector is configured and in its turn is used as the stream for data, and then reconfigured when done in order to resynchronize for its next time slot of service. In this way a rewritable chip can be used to achieve a mutating cipher. Note:

1. Such a design methodology can also be used in other circumstances. Any function, whether randomly changing or changing as a function of some deterministic system, can be similarly implemented and reconfigured as needed.
2. This type of design gets stronger and more responsive as the reconfigurable hardware improves.

This is important because digital circuits are composed of a set of states and transitions. If the set is finite, then it is possible to reconstruct the circuit by observing the outputs from the circuit given a known input sequence. This is a problem if you were to implement a cipher directly into a static chip configuration—it could be reverse engineered by a competitor, or a hacker. If the layout of a circuit is on a printed circuit board (PCB), those layouts are static as are the encoding of the states, I/O definitions, and transitions of the circuit.

From a manufacturing perspective, PCB design is only partially automated, with each layout manually customized for the circuitry of the board, thus, incurring a non-recoverable engineering (NRE) charge for each circuit. Each change to the circuit results in a new PCB layout and each incurs an additional NRE charge. Developing boards is costly and time intensive, a significant portion of the development budget and time line.

Both problems can be solved by taking a new approach to the problem, called Dynamic Pin Reassignment ("DPR."). CipherLoc® DPR is a system of assigning input and output signals to buses that lead to a central signal distribution point, the "crossbar" in the circuit as illustrated by the following diagram of FIG. 6.

Figure 6:
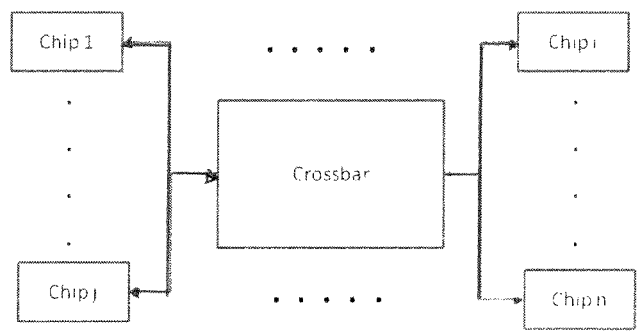
FIG. 6 is a diagram of several chips connected together in a circuit through a crossbar.

As shown in FIG. 6 each chip routes its' input and output (I/O) to the Crossbar. Data about the source or destination of signals is kept and handled at the Crossbar, based on knowledge of the key that is shared between the Crossbar and the chips.

For each chip, there are five sets of information that are managed by the circuit. These sets are:

1. $\{Fctn_{in}|\text{Function pins into the chip}\}$,
2. $\{Fctn_{out}|\text{Function pins out of the chip}\}$,
3. $\{Map_{ci,co,fctn}|ci=\text{input chip, } co=\text{output chip, } fctn=\text{pin function}\}$,
4. $\{Random|\text{one line to each chip}\}$, and
5. $\{Nulls|\text{each null line is a cryptonull}\}$.

The I/O count for each chip, i, is denoted by $IO_i$. Therefore, the total number of wires in the bus to each chip, $b_i$, must be $$bi \geq IOi$$

and, for the entire board, there must be at least B wires on the board, where $$B \geq \sum_{i}^{n}(bi+3)$$

and the additional wires are for communications with the chip and the randomizing data to the chip. Any additional bus connections on the board are used as cryptonulls, routing random, meaningless, data to a chip in order to complicate reconstructing the circuit.

Figure 7:
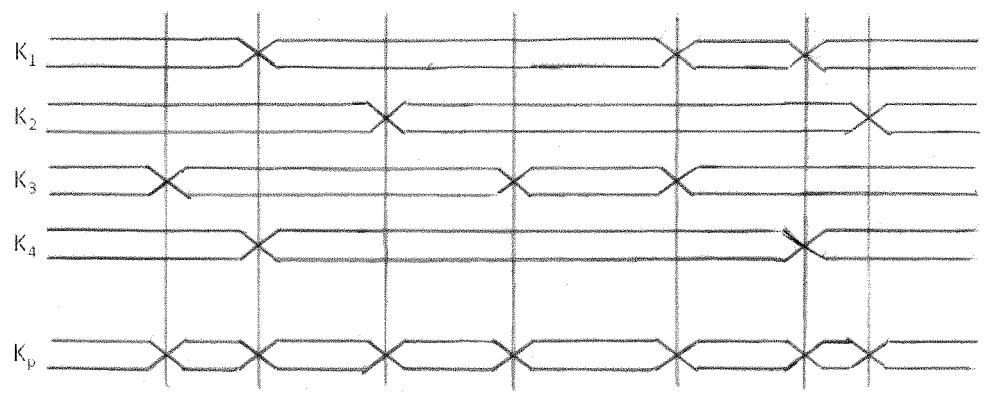
FIG. 7 is a graphic depiction of the use of multiple seeds or keys to alter the states of a circuit.

At the Crossbar, signals are routed from their source to the appropriate destination over one of the bus wires connected to the correct chip from the Crossbar. At irregular intervals, the signal mapping for each I/O functions is changed. The assignments, or mappings, comprise the state of the circuit connection at any time. The period that a state is valid is determined by applying a reseeding function to a portion of a randomized stream that calculates the next state and the duration of validity:

As shown in FIG. 7 Multiple seeds, or keys, are used to create the states. Because each key changes independently of the other keys and without notice, the time interval for a valid state is greatly reduced, complicating any effort to reveal the internal states of chips.

DPR has two main applications: speeding development of a circuit, and circuit security.

Any circuit can be quickly prototyped and produced by implementing the circuit in programmable chips that have the DPR circuitry installed, subject to having enough pins available for the I/O requirements of each individual chip. Any chips that are unused can be depopulated on the board for minimizing the cost of implementation. Having a small set of standard boards that can be mass produced and kept in inventory greatly reduces overhead costs for the first implementation of circuitry. If a product proves successful enough to warrant customized boards, then a second design round can be followed as needed.

The second application is securing a circuit. LR is particularly useful where the hardware does not maintain the same connections and configuration, it is much more difficult to reconstruct the circuit. DPR increases the number of connections (c) for each chip (n) to $$c = \prod_{i=1}^{n} \binom{w_i}{IO_i}$$

where $w_i$ are the number of wires to/from the chip (i), and $IO_i$ are the required number of I/O signals for the chip (i). Further, with proper randomization, the selection changes for every time slot (s) as an independent random variable (IRV). For the length of operation, the number of possible assignments (a) for the circuit I/O is $$a = \prod_{s=1}^{m} c_{ms} = \prod_{s=1}^{m} \left( \prod_{i=1}^{n} \binom{wi}{IOi} \right)_s$$

which increases multiplicatively. With no pseudo random number generation, the only choice for sorting the possible states by brute force attack. A brute force attack requires an average of ½ a guesses, a very large number as s increases. In addition to the large number of possibilities, an attacker must know the results from every input/output pair in order to be able to reconstruct the circuit. Missing data from even a single time period renders circuit reconstruction impossible. Such a large number of possibilities makes it difficult, if not impossible, to reverse engineer the circuit.

CipherLoc®'s Polymorphic Hardware Engine uses DPR to implement its polymorphic hardware solution in FPGA chips and is as secure as a polymorphic key progression algorithm (PKPA). DPR is useful in both security and prototype implementation.

Advantages of Polymorphic Hardware:
1. Prevents reverse engineering of novel circuitry.
2. Can be used to ensure variability from use to use, such as for encryption.
3. Makes state retention and recovery impossible,
4. DPR provides better security against circuit re-engineering because:
   a. The circuit layout is dynamic,
   b. Chip functionality is not readily identified by markings, I/O number, or other physical identifiers,
   c. The initial state of the circuit is not the same each time power is applied,
   d. System configuration does not depend on data provided by a user. No password or key is known by a human and cannot be compromised,
   e. Uses entropy and unicity distance to ensure security, and
   f. Relies on a polymorphic randomization.
   g. Because one cannot reverse engineer the layout and cannot be state analyzed easily
5. The layout of the board is simplified, resulting in
   a. Reduced prototyping costs due to lack of:
      i. Custom design for board
      ii. Iterative board changes
      iii. Wasted time while the board is being fabricated
      iv. Purchase and delivery of required chips
      v. Board fabrication costs
   b. Board reuse. Custom testing boards are no longer necessary, eliminating waste on the bench, the storage of old designs, and the security risk of reverse engineering from lab waste.
   c. No custom design unless realizing a cost reduction or performance enhancement. After the need for security is past or after it is determined that the sales of a design warrant cost reductions for economies of scale, a custom layout may still be performed. Expenses related to prototyping a PCB circuit can be deferred until after the product supports the outlay.
   d. Speeds prototyping. Off the shelf boards can be kept in stock and immediately used. There is no wait for boards to be designed, checked, fabricated, and stocked. Each round of design and development incurs the same penalty. Pre-manufactured boards can cut delay out of the vital time-to-market time period. Using a DPR circuit gives an edge to the company that does require custom board design to release product.

The invention claimed is:

1. A printed circuit board comprising at least one field programmable gate array chip wherein
   (a) input and output signals are assigned to buses that lead to a central distribution point, the crossbar, in the circuit;
   (b) the signals are routed at the crossbar to an appropriate destination over one of the buses to the correct chip from the crossbar;
   (c) the assignments or mappings, comprise the state of the circuit at any time;
   (d) wherein the signal mapping for each in/out function is changed at irregular intervals; and
   (e) the period that a state is valid is determined by applying a reseeding function to a portion of a randomized stream that calculates the next state and the duration of validity.

2. The printed circuit board of claim 1 wherein data about the source or destination of signals is kept and handled at the Crossbar based on knowledge of the key that is shared between the crossbar and the chip.

3. The printed circuit board of claim 2 wherein for each chip, there are five sets of information that are managed by the circuit.

4. The printed circuit board of claim 3 wherein the sets are:
   (a). {$Ctn_{in}$|Function pins into the chip},
   (b). {$Ctn_{out}$|Function pins out of the chip},
   (c). {$Map_{ci,co,fctn}$|ci=input chip, co=output chip, ctn=pin function},
   (d). {Random|one line to each chip}, and
   (e). {Nulls|each null line is a cryptonull}.

5. The printed circuit board of claim 4 wherein
   (a) the I/O count for each chip, i, is denoted by $IO_i$. and he total number of wires in the bus to each chip, $b_i$, is be $$bi \geq IOi;$$

(b) for the entire board, there are at least B wires on the board, where $$B \geq \sum_{i}^{n} (bi+3);$$

(c) the additional wires are for communications with the chip and the randomizing data to the chip; and
   (d) any additional bus connections on the board are used as cryptonulls, routing random, meaningless, data to a chip in order to complicate reconstructing the circuit.

6. A field programmable gate array having multiple reconfigurable sectors and programmed such that a cipher key is implemented in each sector to encrypt a data stream and each sector is configured, used as the stream for data, and then reconfigured when done in order to resynchronize for its next time slot of service.

7. The field programmable gate array of claim 6 wherein reconfigurations take place while one of the ciphers is being used as the stream for data.

8. The field programmable gate array of claim 7 wherein reconfigurations take place in a multiplexer with each line sequentially selected.

9. The field programmable gate array of claim 8 wherein reconfigurations take place in less than a single character so there is no latency seen at the output and overhead takes place when a stream is inactive.

\* \* \* \* \*